(12) United States Patent
Okubo et al.

(10) Patent No.: US 11,936,077 B2
(45) Date of Patent: Mar. 19, 2024

(54) SEPARATOR MEMBER AND FUEL CELL

(71) Applicant: HONDA MOTOR CO., LTD., Tokyo (JP)

(72) Inventors: Takuro Okubo, Wako (JP); Shuhei Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 171 days.

(21) Appl. No.: 17/388,319

(22) Filed: Jul. 29, 2021

(65) Prior Publication Data
US 2022/0037680 A1 Feb. 3, 2022

(30) Foreign Application Priority Data
Aug. 3, 2020 (JP) ................................. 2020-131664

(51) Int. Cl.
| | |
|---|---|
| *H01M 8/0273* | (2016.01) |
| *H01M 8/0206* | (2016.01) |
| *H01M 8/0258* | (2016.01) |
| *H01M 8/1004* | (2016.01) |
| *H01M 8/10* | (2016.01) |

(52) U.S. Cl.
CPC ....... *H01M 8/0273* (2013.01); *H01M 8/0206* (2013.01); *H01M 8/0258* (2013.01); *H01M 8/1004* (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 2018/0123141 | A1* | 5/2018 | Xi | ................... H01M 8/026 |
| 2018/0145353 | A1* | 5/2018 | Yang | ............... H01M 4/8605 |
| 2019/0074525 | A1* | 3/2019 | Tomana | ............ H01M 8/0276 |
| 2019/0097244 | A1 | 3/2019 | Oyama et al. | |
| 2019/0157690 | A1 | 5/2019 | Ishida et al. | |
| 2019/0393514 | A1 | 12/2019 | Goto et al. | |
| 2020/0212472 | A1 | 7/2020 | Ikeda et al. | |

FOREIGN PATENT DOCUMENTS

| | | |
|---|---|---|
| CN | 108023095 A | 5/2018 |
| CN | 108091900 A | 5/2018 |
| CN | 109560302 A | 4/2019 |
| CN | 109585874 A | 4/2019 |
| CN | 109802156 A | 5/2019 |

(Continued)

OTHER PUBLICATIONS

Office Action dated Apr. 19, 2022 issued over the corresponding Japanese Patent Application No. 2020-131664 with the English translation thereof.

(Continued)

*Primary Examiner* — Alix E Eggerding
(74) *Attorney, Agent, or Firm* — Carrier, Shende & Associates P.C.; Joseph P. Carrier; Jeffrey T. Gedeon

(57) ABSTRACT

A first separator member forming a power generation cell, which is a fuel cell, includes a first separator body. A first support bead, which is formed to be lower in height than a first seal bead and restricts the inclination of the first seal bead, is provided outside a first seal in the first separator body. The width of the first support bead varies depending on the position of the first support bead in the direction in which the first support bead extends.

11 Claims, 8 Drawing Sheets

(56) References Cited

FOREIGN PATENT DOCUMENTS

| | | |
|---|---|---|
| CN | 110649278 A | 1/2020 |
| CN | 111403770 A | 7/2020 |
| JP | 2014-229577 A | 12/2014 |

OTHER PUBLICATIONS

Office Action dated Sep. 29, 2023 issued in the corresponding Chinese Patent Application No. 202110861725.X with the English machine translation thereof.
Office Action dated Jan. 17, 2024 issued in the corresponding Chinese Patent Application No. 202110861725.X with the English machine translation thereof.

* cited by examiner

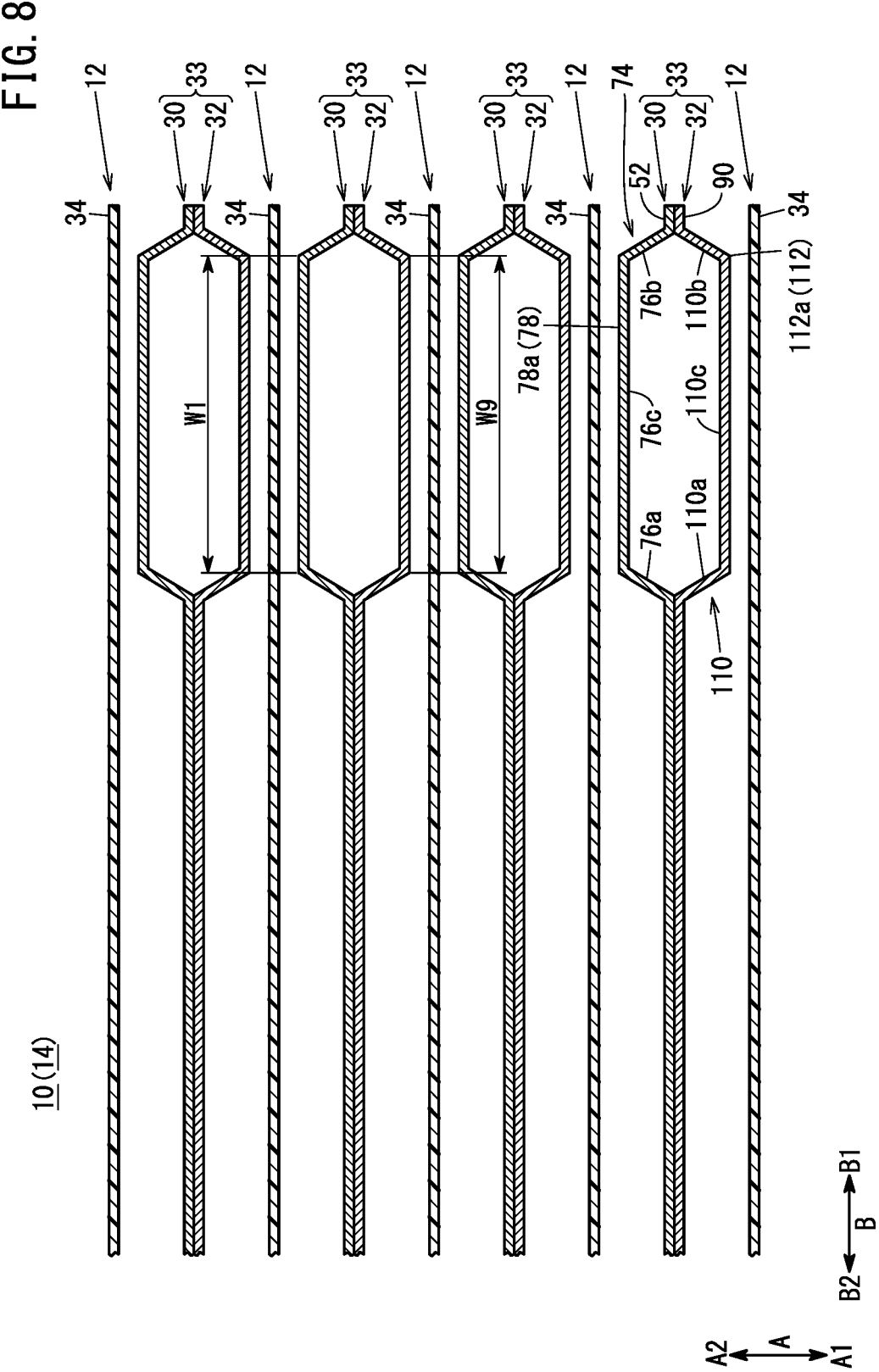

SEPARATOR MEMBER AND FUEL CELL

CROSS-REFERENCE TO RELATED APPLICATION

This application is based upon and claims the benefit of priority from Japanese Patent Application No. 2020-131664 filed on Aug. 3, 2020, the contents of which are incorporated herein by reference.

BACKGROUND OF THE INVENTION

Field of the Invention

The present invention relates to a separator member and a fuel cell.

Description of the Related Art

The fuel cell stack is formed by stacking a plurality of power generation cells (fuel cells). Each of the plurality of power generation cells includes a membrane electrode assembly (MEA) having an electrolyte membrane and electrodes disposed on both sides of the electrolyte membrane, and a pair of separator members disposed on both sides of the MEA. A compression load is applied to the fuel cell stack in the stacking direction of the MEA and the separator members (separator thickness direction).

Each separator member includes a separator body made of metal and having a plate shape. The separator body is provided with a reactant gas flow field, a plurality of fluid passages, and a seal. The reactant gas flow field allows a reactant gas (oxygen-containing gas or fuel gas) to flow therethrough. The plurality of fluid passages penetrate the separator body and allow a fluid, which is a reactant gas or a coolant, to flow therethrough. The seal prevents leakage of the fluid. The seal includes a seal bead formed integrally with the separator body and protruding from the separator body so as to be elastically deformable by a compression load. The top portion of the seal is airtightly pressed against the resin film (resin frame member) provided on the outer peripheral portion of the MEA in a state where the seal bead is elastically deformed by the compression load.

For example, US2018/0145353 A1 discloses a separator member with an auxiliary bead for uniformly distributing compressive pressure. The auxiliary bead is positioned outside the seal in the separator body. The auxiliary bead is formed integrally with the separator body and protrudes from the separator body.

SUMMARY OF THE INVENTION

When the separator member and the MEA are stacked together, the seal bead of the separator member may be inclined in a planar direction orthogonal to the separator thickness direction. When the seal bead is inclined in the planar direction, the seal surface of the seal is displaced in the planar direction, and thus a desired sealing property by the seal may not be obtained. Since the auxiliary bead of the related art as described above is an auxiliary bead for uniformly distributing the compressive pressure, it cannot sufficiently suppress the inclination of the seal bead. Therefore, the inclination of the seal bead in the planar direction cannot be effectively suppressed.

An object of the present invention is to solve the above-described problem.

According to an aspect of the present invention, there is provided a separator member configured to be incorporated into a fuel cell stack in a manner that the separator member is stacked on a membrane electrode assembly including an electrolyte membrane and an electrode disposed on each of both sides of the electrolyte membrane, wherein a compression load in a separator thickness direction is applied to the separator member, the separator member includes a separator body made of metal and having a plate shape, the separator body is provided with a reactant gas flow field configured to allow a reactant gas to flow along the electrode, a plurality of fluid passages penetrating the separator body in the separator thickness direction and connected to the reactant gas flow field or a coolant flow field, and a seal positioned around the reactant gas flow field and the plurality of fluid passages and configured to prevent leakage of a fluid formed of the reactant gas or a coolant, the seal includes a seal bead formed integrally with the separator body and protruding from the separator body so as to be elastically deformable by the compression load, a support bead formed to be lower in height than the seal bead and configured to restrict inclination of the seal bead is provided outside the seal in the separator body, the support bead extends along the seal, and is formed integrally with the separator body and protrudes from the separator body, and a width of the support bead varies depending on a position of the support bead in a direction in which the support bead extends.

According to another aspect of the present invention, there is provided a fuel cell comprising: a membrane electrode assembly including an electrolyte membrane and an electrode disposed on each of both sides of the electrolyte membrane; and a pair of separator members disposed on both sides of the membrane electrode assembly, wherein a compression load in a separator thickness direction is applied to the fuel cell, and at least one of the pair of separator members is the above-described separator member.

According to the present invention, since the width of the support bead varies depending on the position of the support bead in the direction in which the support bead extends, the rigidity of the support bead in the width direction can be improved. Further, when the separator member and the membrane electrode assembly are stacked together and a compression load is applied thereto, the support bead can effectively prevent the seal bead from being inclined. Therefore, a desired sealing property by the seal can be ensured.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 8 is a cross-sectional explanatory view taken along line VIII-VIII of FIG. 5.

DESCRIPTION OF THE PREFERRED EMBODIMENTS

Figure 1:
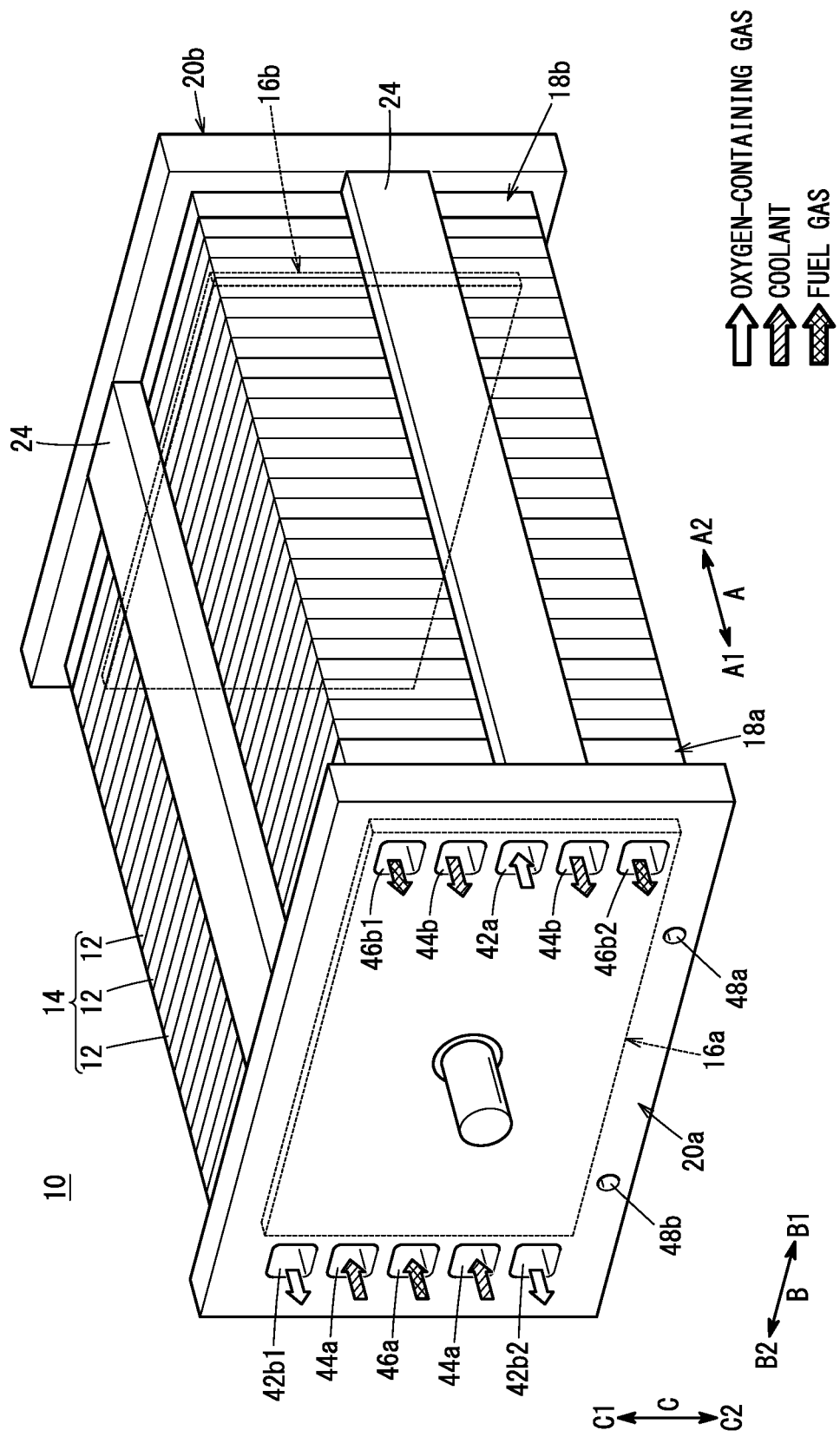
FIG. 1 is a perspective view of a fuel cell stack including a fuel cell (power generation cell) according to an embodiment of the present invention.

As shown in FIG. 1, a fuel cell stack 10 according to an embodiment of the present invention includes a stack body 14 in which a plurality of power generation cells 12 (fuel cells) are stacked in a horizontal direction (direction of an arrow A). For example, the fuel cell stack 10 is mounted on a fuel cell vehicle such as a fuel cell electric vehicle (not shown).

At one end (end in the direction of an arrow A1) of the stack body 14 in the stacking direction, a terminal plate 16a, an insulator 18a, and an end plate 20a are disposed outward in this order. At the other end (end in the direction of an arrow A2) of the stack body 14 in the stacking direction, a terminal plate 16b, an insulator 18b, and an end plate 20b are disposed outward in this order.

Each of the end plates 20a and 20b has a horizontally long (or vertically long) rectangular shape. Connecting bars 24 are arranged between respective sides of the end plate 20a and the end plate 20b. Both ends of each connecting bar 24 are fixed to the inner surfaces of the end plates 20a and 20b. Each connecting bar 24 applies a compression load (tightening load) in the stacking direction (direction of the arrow A) to the plurality of stacked power generation cells 12. The fuel-cell stack 10 may include a casing having the end plates 20a and 20b, and the stack body 14 may be accommodated in the casing.

Figure 2:
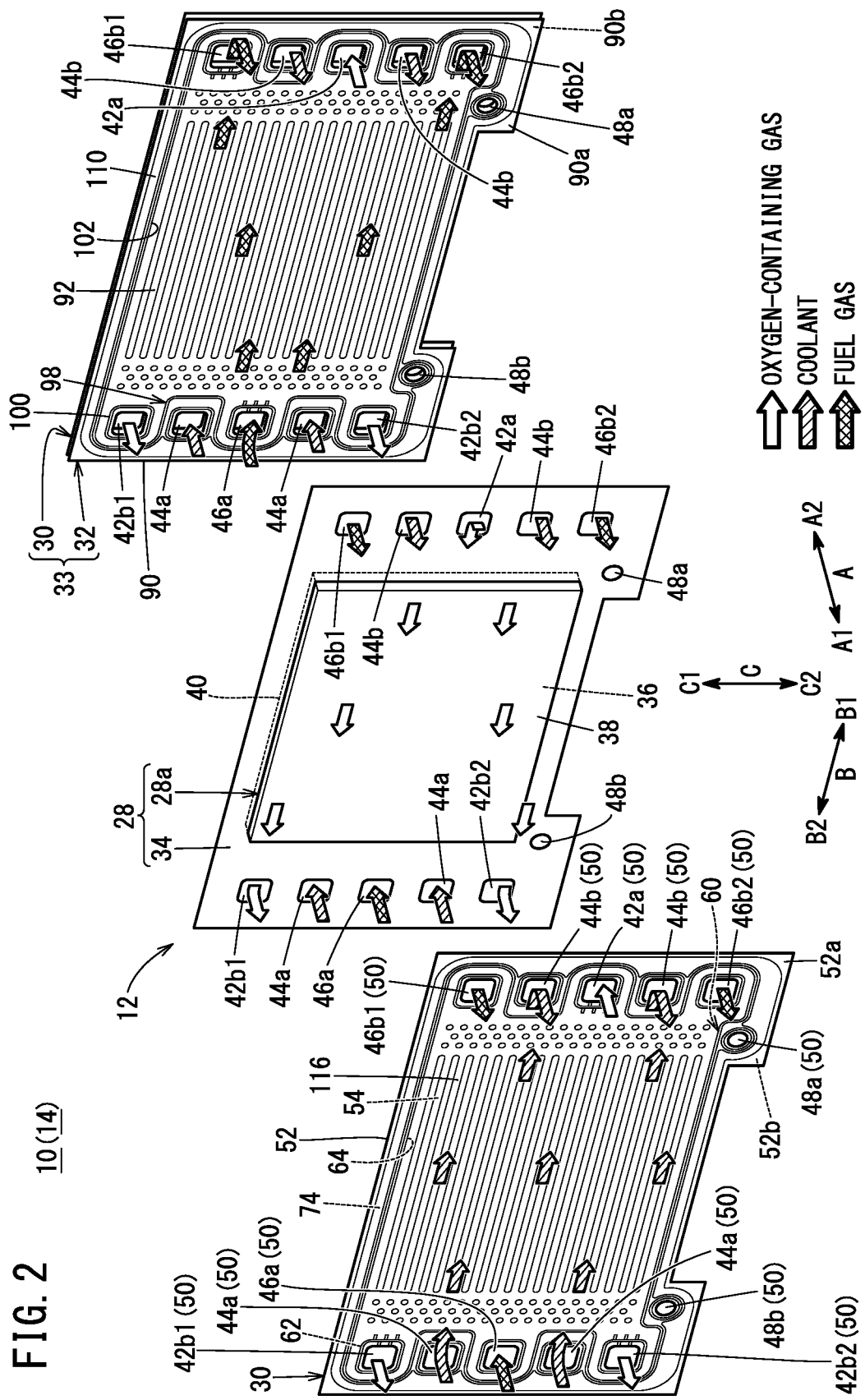
FIG. 2 is a partially omitted exploded perspective view of the fuel cell stack of FIG. 1.

The power generation cell 12 has a horizontally long rectangular shape. As shown in FIG. 2, the power generation cell 12 includes a resin frame equipped MEA28, and a first separator member 30 and a second separator member 32 that sandwich the resin frame equipped MEA28 from the direction of the arrow A. Each of the first separator member 30 and the second separator member 32 is formed by press forming of a thin metal plate to have a corrugated shape in cross section and a wavy shape on the surface. Examples of the thin metal plate include a steel plate, a stainless steel plate, an aluminum plate, and a plated steel plate. The surface of the thin metal plate may be subjected to surface treatment for corrosion prevention.

The first separator member 30 and the second separator member 32 are joined to each other by a plurality of joining lines 33a (see FIG. 7) to form a joint separator 33. The joining lines 33a are provided on both sides of first fluid passage seals 62 and second fluid passage seals 100 described later. The joining lines 33a are provided outside a first flow field seal 64 and a second flow field seal 102 described later. The joint separator 33 is provided with a plurality of joint portions (not shown) that join the outermost periphery of the first separator member 30 and the outermost periphery of the second separator member 32 to each other. The plurality of joint portions are provided at intervals along the outer periphery of the joint separator 33. The joining line 33a is, for example, a laser welding line. The joining line 33a may be a joint portion where the first separator member 30 and the second separator member 32 are joined by MIG, TIG, seam welding, brazing, crimping, or the like.

In FIG. 2, the resin frame equipped MEA28 includes a membrane electrode assembly 28a (hereinafter referred to as "MEA28a") and a resin frame member 34 (resin frame portion, resin film). The MEA28a includes an electrolyte membrane 36, a cathode 38 provided on one surface of the electrolyte membrane 36, and an anode 40 provided on the other surface of the electrolyte membrane 36.

The electrolyte membrane 36 is, for example, a solid polymer electrolyte membrane (cation ion exchange membrane). The solid polymer electrolyte membrane is, for example, a thin film of perfluorosulfonic acid containing water. The electrolyte membrane 36 is sandwiched between the cathode 38 and the anode 40. As the electrolyte membrane 36, an HC (hydrocarbon)-based electrolyte can be used in addition to a fluorine-based electrolyte.

Although not shown in detail, the cathode 38 includes a first electrode catalyst layer joined to one surface of the electrolyte membrane 36 and a first gas diffusion layer stacked on the first electrode catalyst layer. The anode 40 includes a second electrode catalyst layer joined to the other surface of the electrolyte membrane 36 and a second gas diffusion layer stacked on the second electrode catalyst layer.

The resin frame member 34 is joined to the outer peripheral portion of the MEA28a and surrounds the outer peripheral portion. The resin frame portion of the resin frame equipped MEA28 may be formed by making the electrolyte membrane 36 protrude outward from the cathode 38 and the anode 40 without using the resin frame member 34. In this case, a frame-shaped film may be provided on both sides of a portion of the electrolyte membrane 36 protruding outward from the cathode 38 and the anode 40.

An oxygen-containing gas supply passage 42a, a plurality of (for example, two) coolant discharge passages 44b, a first fuel gas discharge passage 46b1, and a second fuel gas discharge passage 46b2 are provided at one end of the power generation cell 12 in the long-side direction (the end in the direction of an arrow B1). As shown in FIGS. 1 and 2, the oxygen-containing gas supply passage 42a, the plurality of coolant discharge passages 44b, the first fuel gas discharge passage 46b1, and the second fuel gas discharge passage 46b2 extend through the stack body 14, the insulator 18a, and the end plate 20a in the stacking direction. The oxygen-containing gas supply passage 42a, the plurality of coolant discharge passages 44b, the first fuel gas discharge passage 46b1, and the second fuel gas discharge passage 46b2 may extend through the terminal plate 16a.

In FIG. 2, the oxygen-containing gas supply passage 42a, the plurality of coolant discharge passages 44b, the first fuel gas discharge passage 46b1, and the second fuel gas discharge passage 46b2 are arranged in the direction of an arrow C. The direction of the arrow C is a direction along the short side of the power generation cell 12. A fuel gas, for example, a hydrogen-containing gas is discharged in the direction of the arrow A through each of the first fuel gas discharge passage 46b1 and the second fuel gas discharge passage 46b2. The fuel gas is one of reactant gases. An oxygen-containing gas is supplied in the direction of the arrow A through the oxygen-containing gas supply passage 42a. The oxygen-containing gas is the other of the reactant gases. The coolant is discharged in the direction of the arrow A through the coolant discharge passage 44b.

The oxygen-containing gas supply passage 42a is disposed between the two coolant discharge passages 44b spaced apart from each other in the up-down direction. The first fuel gas discharge passage 46b1 is disposed above the upper coolant discharge passage 44b (in the direction of an arrow C1). The second fuel gas discharge passage 46b2 is disposed below the lower coolant discharge passage 44b (in the direction of an arrow C2).

A fuel gas supply passage 46a, a plurality of (for example, two) coolant supply passages 44a, a first oxygen-containing gas discharge passage 42b1, and a second oxygen-containing gas discharge passage 42b2 are provided at the other end of the power generation cell 12 in the long-side direction (the end in the direction of an arrow B2). As shown in FIGS. 1 and 2, the fuel gas supply passage 46a, the plurality of coolant supply passages 44a, the first oxygen-containing gas discharge passage 42b1, and the second oxygen-containing gas discharge passage 42b2 extend through the stack body 14, the insulator 18a, and the end plate 20a in the stacking direction. The fuel gas supply passage 46a, the plurality of coolant supply passages 44a, the first oxygen-containing gas discharge passage 42b1, and the second oxygen-containing gas discharge passage 42b2 may extend through the terminal plate 16a.

In FIG. 2, the fuel gas supply passage 46a, the plurality of coolant supply passages 44a, the first oxygen-containing gas discharge passage 42b1, and the second oxygen-containing gas discharge passage 42b2 are arranged in the direction of the arrow C. The fuel gas is supplied in the direction of the arrow A through the fuel gas supply passage 46a. The oxygen-containing gas is discharged in the direction of the arrow A through each of the first oxygen-containing gas discharge passage 42b1 and the second oxygen-containing gas discharge passage 42b2. The coolant is supplied in the direction of the arrow A through the coolant supply passage 44a.

The fuel gas supply passage 46a is disposed between the two coolant supply passages 44a spaced apart from each other in the up-down direction. The first oxygen-containing gas discharge passage 42b1 is disposed above the upper coolant supply passage 44a (in the direction of the arrow C1). The second oxygen-containing gas discharge passage 42b2 is disposed below the lower coolant supply passage 44a (in the direction of the arrow C2).

Each power generation cell 12 is provided with a first drain passage 48a and a second drain passage 48b. As shown in FIGS. 1 and 2, the first drain passage 48a and the second drain passage 48b extend through the stack body 14, the insulator 18a, and the end plate 20a in the stacking direction. The first drain passage 48a and the second drain passage 48b may extend through the terminal plate 16a.

In FIG. 2, the first drain passage 48a is located at an end portion (lower end portion) of the power generation cell 12 in the direction of the arrow C2. The first drain passage 48a is located between the center of the power generation cell 12 in the longitudinal direction and one end of the power generation cell 12 in the longitudinal direction. The first drain passage 48a is located below the lower end of the second fuel gas discharge passage 46b2 (see FIGS. 3 to 5).

The first drain passage 48a is connected to the first fuel gas discharge passage 46b1 and the second fuel gas discharge passage 46b2 via a communication path (not shown) provided in the insulator 18b or the end plate 20b. That is, a portion of water generated during the operation of the power generation cell 12 (during power generation) is guided to the first fuel gas discharge passage 46b1 and the second fuel gas discharge passage 46b2 and is discharged to the outside through the first drain passage 48a.

The second drain passage 48b is located at an end portion (lower end portion) of the power generation cell 12 in the direction of the arrow C2. The second drain passage 48b is located between the center of the power generation cell 12 in the longitudinal direction and the other end of the power generation cell 12 in the longitudinal direction. The second drain passage 48b is located below the lower end of the second oxygen-containing gas discharge passage 42b2 (see FIGS. 3, 5, and 6).

The second drain passage 48b is connected to the first oxygen-containing gas discharge passage 42b1 and the second oxygen-containing gas discharge passage 42b2 via a communication path (not shown) provided in the insulator 18b or the end plate 20b. That is, a portion of water generated during the operation of the power generation cell 12 (during power generation) is guided to the first oxygen-containing gas discharge passage 42b1 and the second oxygen-containing gas discharge passage 42b2 and is discharged to the outside through the second drain passage 48b.

In the following description, the oxygen-containing gas supply passage 42a, the first oxygen-containing gas discharge passage 42b1, the second oxygen-containing gas discharge passage 42b2, the coolant supply passages 44a, the coolant discharge passages 44b, the fuel gas supply passage 46a, the first fuel gas discharge passage 46b1, the second fuel gas discharge passage 46b2, the first drain passage 48a, and the second drain passage 48b may be simply referred to as fluid passages 50.

The arrangement, shape, and size of each fluid passage 50 are not limited to those in the present embodiment, and may be appropriately set according to required specifications.

Figure 3:
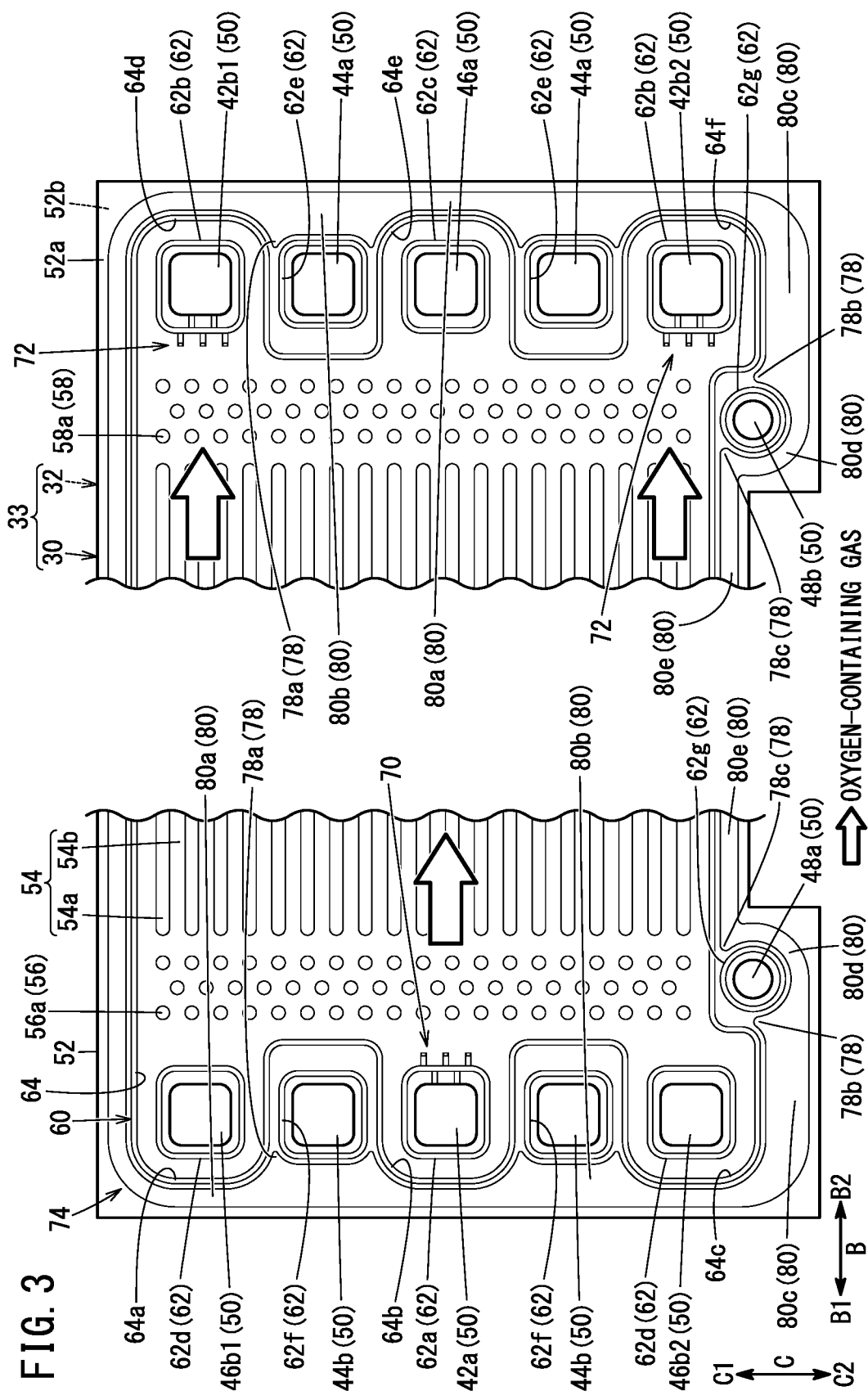
FIG. 3 is a partially omitted plan view of a joint separator of FIG. 2 as viewed from the side where a first separator member is located.

As shown in FIG. 3, the first separator member 30 includes a first separator body 52 made of metal and having a plate shape. The first separator body 52 has, on its surface facing the resin frame equipped MEA28 (hereinafter referred to as "surface 52a"), an oxygen-containing gas flow field 54 (reactant gas flow field) extending in the direction of the arrow B, for example. The oxygen-containing gas flow field 54 is connected to (in fluid communication with) the oxygen-containing gas supply passage 42a, the first oxygen-containing gas discharge passage 42b1, and the second oxygen-containing gas discharge passage 42b2. The oxygen-containing gas flow field 54 includes a plurality of linear flow grooves 54b. The plurality of linear flow grooves 54b are formed between a plurality of linear protrusions 54a extending in the direction of the arrow B. However, the oxygen-containing gas flow field 54 (the protrusions 54a and the flow grooves 54b) may extend in a wavy shape in the direction of the arrow B.

A first inlet buffer 56 and a first outlet buffer 58 are provided on the surface 52a of the first separator body 52. The first inlet buffer 56 is located between the oxygen-containing gas supply passage 42a and the oxygen-containing gas flow field 54. The first inlet buffer 56 has a plurality of boss arrays each including a plurality of bosses 56a arranged in the direction of the arrow C. The first outlet buffer 58 is located between the first oxygen-containing gas discharge passage 42b1 and the oxygen-containing gas flow field 54 and between the second oxygen-containing gas discharge passage 42b2 and the oxygen-containing gas flow field 54. The first outlet buffer 58 has a plurality of boss arrays each including a plurality of bosses 58a arranged in the direction of the arrow C.

A first seal 60 for preventing leakage of fluid is provided on the surface 52a of the first separator body 52. The fluid is a reactant gas (oxygen-containing gas or fuel gas) or a coolant. The first seal 60 extends linearly when viewed from the separator thickness direction (direction of the arrow A).

However, the first seal 60 may extend in a wavy shape when viewed from the separator thickness direction.

The first seal 60 includes a plurality of first fluid passage seals 62 (62a to 62g) that surround the plurality of fluid passages 50, respectively, and the first flow field seal 64 (first outer peripheral seal) provided on the outer peripheral portion of the first separator body 52.

Hereinafter, among the plurality of first fluid passage seals 62, the first fluid passage seal 62 surrounding the oxygen-containing gas supply passage 42a is referred to as "first fluid passage seal 62a". Among the plurality of first fluid passage seals 62, the first fluid passage seals 62 surrounding the first oxygen-containing gas discharge passage 42b1 and the second oxygen-containing gas discharge passage 42b2 are referred to as "first fluid passage seals 62b". Among the plurality of first fluid passage seals 62, the first fluid passage seal 62 surrounding the fuel gas supply passage 46a is referred to as "first fluid passage seal 62c". Among the plurality of first fluid passage seals 62, the first fluid passage seals 62 surrounding the first fuel gas discharge passage 46b1 and the second fuel gas discharge passage 46b2 are referred to as "first fluid passage seals 62d". Among the plurality of first fluid passage seals 62, the first fluid passage seals 62 surrounding the coolant supply passages 44a are referred to as "first fluid passage seals 62e". Among the plurality of first fluid passage seals 62, the first fluid passage seals 62 surrounding the coolant discharge passages 44b are referred to as "first fluid passage seals 62f". Among the plurality of first fluid passage seals 62, the first fluid passage seals 62 surrounding the first drain passage 48a and the second drain passage 48b are referred to as "first fluid passage seals 62g".

The first flow field seal 64 prevents leakage of the reactant gas (oxygen-containing gas). The first flow field seal 64 surrounds the oxygen-containing gas flow field 54, the first inlet buffer 56, the first outlet buffer 58, and the plurality of first fluid passage seals 62a to 62d. The first fluid passage seals 62e to 62g are outer fluid passage seals positioned outside the first flow field seal 64.

The first flow field seal 64 meanders on one end side (direction of the arrow B1) in the longitudinal direction of the first separator body 52. The first flow field seal 64 extends between the first fuel gas discharge passage 46b1 and the upper coolant discharge passage 44b. The first flow field seal 64 extends between the upper coolant discharge passage 44b and the oxygen-containing gas supply passage 42a. The first flow field seal 64 extends between the oxygen-containing gas supply passage 42a and the lower coolant discharge passage 44b. The first flow field seal 64 extends between the lower coolant discharge passage 44b and the second fuel gas discharge passage 46b2. Therefore, on one end side in the longitudinal direction of the first separator body 52, the first flow field seal 64 has three first bulging portions 64a, 64b, and 64c that bulge toward one of the short sides of the first separator body 52. The first bulging portion 64a partially surrounds the first fuel gas discharge passage 46b1. The first bulging portion 64b partially surrounds the oxygen-containing gas supply passage 42a. The first bulging portion 64c partially surrounds the second fuel gas discharge passage 46b2.

The first flow field seal 64 meanders on the other end side (direction of the arrow B2) in the longitudinal direction of the first separator body 52. The first flow field seal 64 extends between the first oxygen-containing gas discharge passage 42b1 and the upper coolant supply passage 44a. The first flow field seal 64 extends between the upper coolant supply passage 44a and the fuel gas supply passage 46a. The first flow field seal 64 extends between the fuel gas supply passage 46a and the lower coolant supply passage 44a. The first flow field seal 64 extends between the lower coolant supply passage 44a and the second oxygen-containing gas discharge passage 42b2. Therefore, on the other end side in the longitudinal direction of the first separator body 52, the first flow field seal 64 includes three first bulging portions 64d, 64e, and 64f that bulge toward the other short side of the first separator body 52. The first bulging portion 64d partially surrounds the first oxygen-containing gas discharge passage 42b1. The first bulging portion 64e partially surrounds the fuel gas supply passage 46a. The first bulging portion 64f partially surrounds the second oxygen-containing gas discharge passage 42b2.

Figure 7:
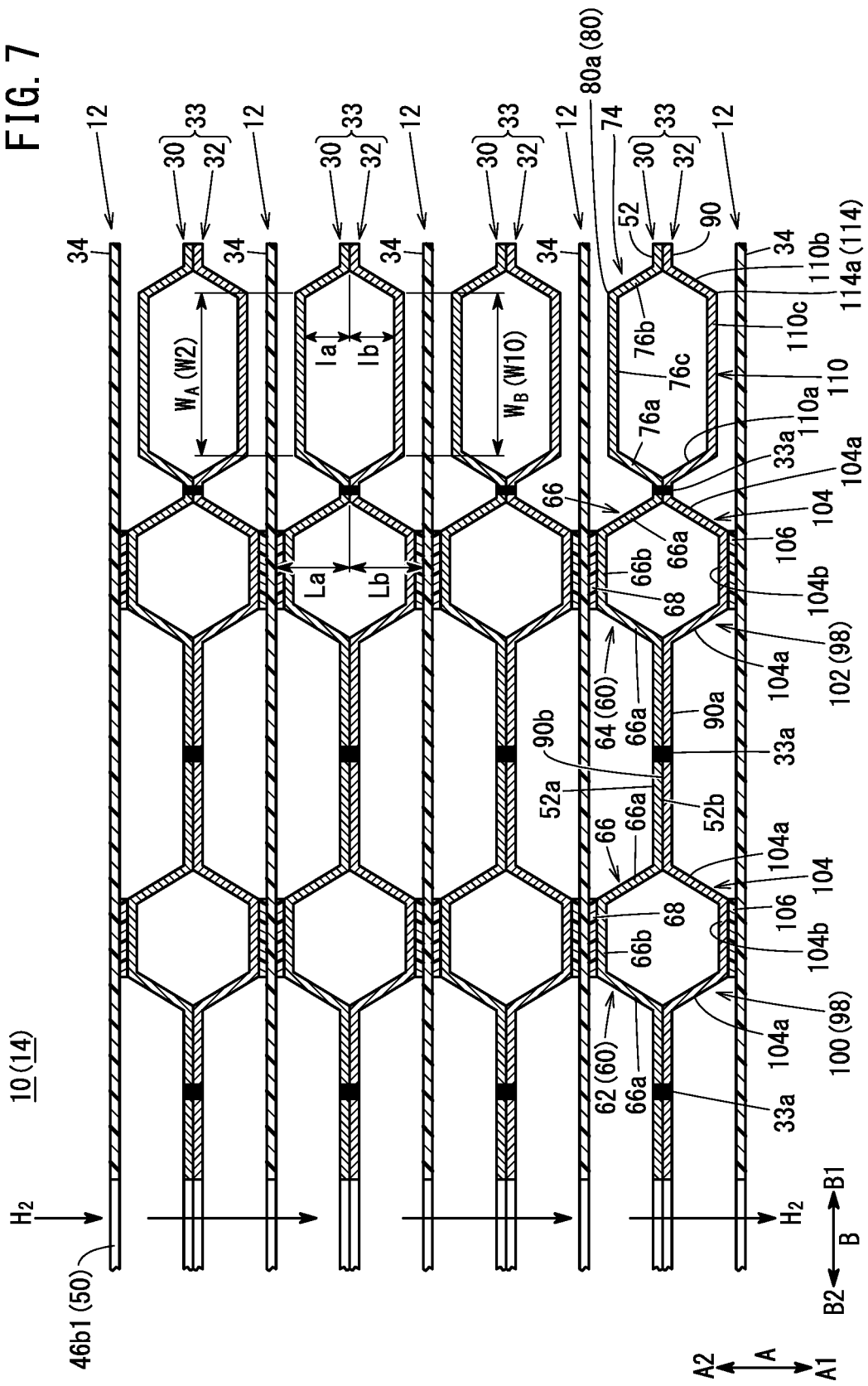
FIG. 7 is a cross-sectional explanatory view taken along line VII-VII of FIG. 5.

As shown in FIG. 7, the first seal 60 includes a first seal bead 66 and a first resin member 68. The first seal bead 66 is a metal-molded portion formed integrally with the first separator body 52 by press forming so as to protrude toward the resin frame equipped MEA28. The cross-sectional shape of the first seal bead 66 is a trapezoidal shape that tapers in the protruding direction of the first seal bead 66. That is, the first seal bead 66 is elastically deformed by the compression load in the stacking direction of the first separator member 30 and the second separator member 32.

The first seal bead 66 includes a pair of first bead side portions 66a facing each other, and a first bead top portion 66b connecting top portions of the pair of first bead side portions 66a. An interval between the pair of first bead side portions 66a gradually decreases toward the first bead top portion 66b. The first bead side portion 66a may be parallel to the separator thickness direction (direction of the arrow A). That is, the cross-sectional shape of the first seal bead 66 may be a rectangular shape or a square shape.

The first resin member 68 is provided on the first seal bead 66. The first resin member 68 is an elastic member fixed to the protruding end surface of the first seal bead 66 (the outer surface of the first bead top portion 66b) by, for example, printing or coating. The first resin member 68 is made of, for example, polyester fiber. The first resin member 68 is not porous. The first resin member 68 may be omitted.

In FIG. 3, the first separator body 52 is provided with a bridge portion 70 that allows the inside (the oxygen-containing gas supply passage 42a) and the outside (the oxygen-containing gas flow field 54) of the first fluid passage seal 62a to communicate with each other. The first separator body 52 is provided with a bridge portion 72 that allows the inside (the first oxygen-containing gas discharge passage 42b1 or the second oxygen-containing gas discharge passage 42b2) and the outside (the oxygen-containing gas flow field 54) of the first fluid passage seal 62b to communicate with each other.

In FIG. 7, a first support bead 74 is provided outside the first seal 60 in the first separator body 52. The first support bead 74 is formed to be lower in height than the first seal bead 66. The first support bead 74 restricts inclination of the first seal bead 66. The first support bead 74 extends along the outer periphery of the first seal 60. The first support bead 74 is a metal-molded portion formed integrally with the surface 52a of the first separator body 52 and protruding therefrom. The first support bead 74 is adjacent to the first seal bead 66. The first support bead 74 protrudes from the first separator body 52 in the same direction (direction toward the resin frame member 34) as the protruding direction of the first seal bead 66.

In FIG. 7, in a state in which the first separator member 30 is incorporated into the fuel cell stack 10, a protruding length 1a of the first support bead 74 is shorter than a protruding length La of the first seal 60. Therefore, the first support bead 74 is separated from the resin frame member 34. That is, there is a slight gap between the first support bead 74 and the resin frame member 34. Therefore, the first support bead 74 does not receive a compression load from the resin frame member 34. The first support bead 74 may be in contact with the resin frame member 34 so as not to receive a compression load. However, when an impact load in the direction of the arrow A acts on the fuel cell stack 10, the first support bead 74 comes into contact with the resin frame member 34 and receives the impact load.

Specifically, in a state in which the first separator member 30 is incorporated into the fuel cell stack 10, the protruding length 1a of the first support bead 74 is shorter than the protruding length of the first seal bead 66. In a state in which the first separator member 30 is incorporated into the fuel cell stack 10, the protruding length 1a of the first support bead 74 is preferably 50% or more and less than 100% of the protruding length of the first seal bead 66, more preferably 60% or more and 90% or less of the protruding length of the first seal bead 66, and even more preferably 70% or more and 90% or less of the protruding length of the first seal bead 66. In this case, when the first separator member 30 is incorporated into the fuel cell stack 10, the first support bead 74 can effectively prevent the first seal bead 66 from being inclined in the planar direction. Further, the impact load can be effectively received by the first support bead 74. The protruding length of the first support bead 74 can be set as appropriate.

The first support bead 74 extends along and around the outer periphery of the first separator body 52 (see FIG. 2). In other words, the first support bead 74 is positioned outside the plurality of first fluid passage seals 62 and outside the first flow field seal 64. The outer periphery of the first support bead 74 extends along the outer periphery of the first separator body 52.

The cross-sectional shape of the first support bead 74 is a trapezoidal shape that tapers in the protruding direction of the first support bead 74. The first support bead 74 includes a first inner side wall 76a, a first outer side wall 76b, and a first top wall 76c. In the first separator body 52, the first inner side wall 76a is located inward of the first outer side wall 76b. In the first separator body 52, the first outer side wall 76b is located outward of the first inner side wall 76a. The first top wall 76c connects the protruding end of the first inner side wall 76a and the protruding end of the first outer side wall 76b to each other. An interval between the first inner side wall 76a and the first outer side wall 76b gradually decreases toward the first top wall 76c. The root of the first inner side wall 76a is close to the root of the first bead side portion 66a.

The root of the first inner side wall 76a may be connected to the root of the first bead side portion 66a. The root of the first inner side wall 76a may be connected to an intermediate portion of the first bead side portion 66a. The first inner side wall 76a and the first outer side wall 76b may extend parallel to the separator thickness direction (direction of the arrow A). That is, the cross-sectional shape of the first support bead 74 may be a rectangular shape or a square shape.

Figure 4:
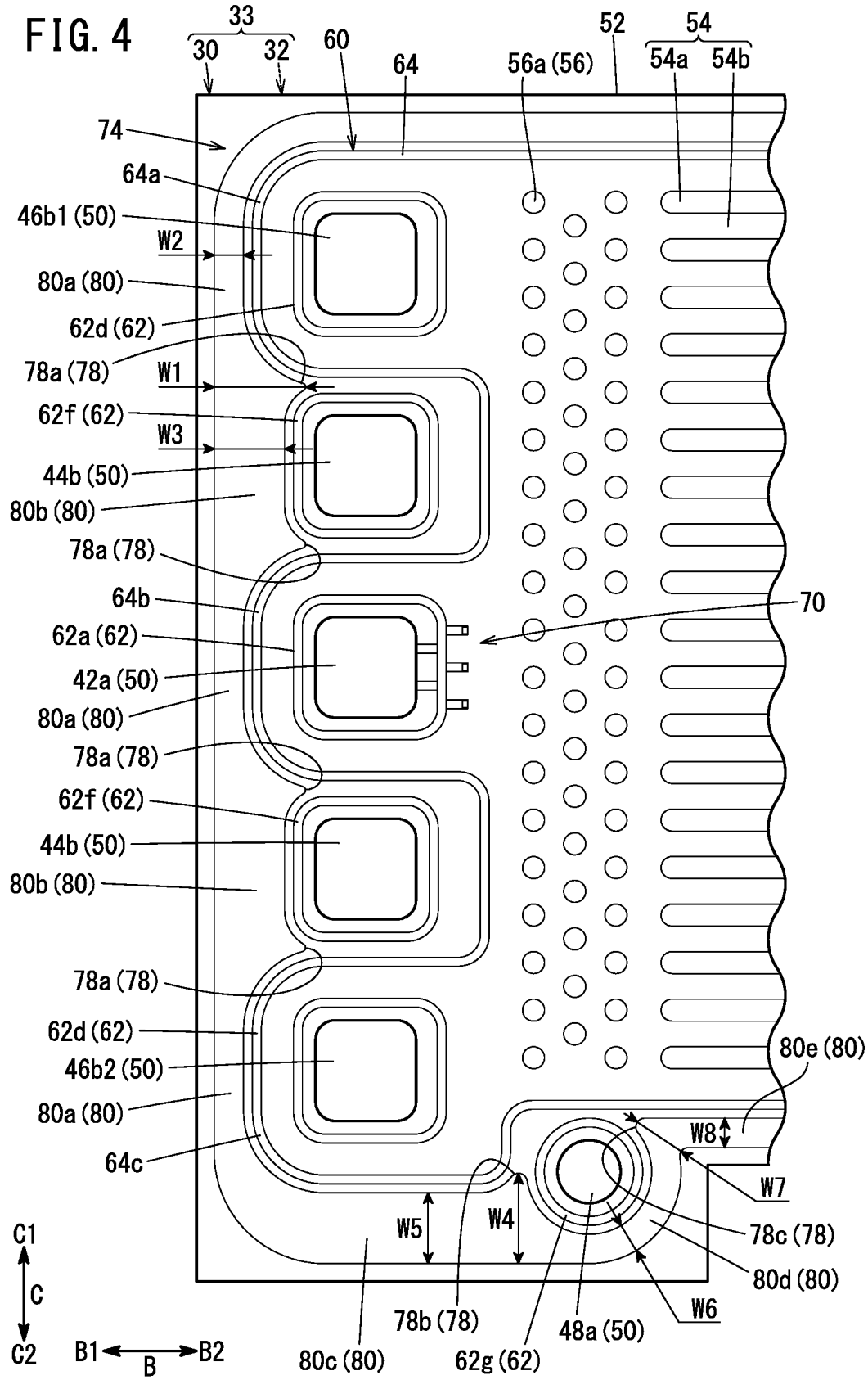
FIG. 4 is a partially enlarged plan view of the joint separator of FIG. 3.

In FIGS. 3, 7 and 8, the outer peripheral edge portion (first outer side wall 76b) of the first support bead 74 has a portion extending linearly along the outer edge of the first separator body 52. A width $W_A$ of the first support bead 74 (the width of the first top wall 76c shown in FIG. 7) varies depending on the position of the first support bead 74 in the extending direction thereof. Here, the width $W_A$ of the first support bead 74 refers to a length in a direction orthogonal to the extending direction of the first support bead 74 and to the separator thickness direction. In FIGS. 3 and 4, an inner boundary portion of the first top wall 76c and an outer boundary portion of the first top wall 76c are shown for convenience (see FIGS. 7 and 8). The inner boundary portion of the first top wall 76c is a boundary portion between the first top wall 76c and the first inner side wall 76a. The outer boundary portion of the first top wall 76c is a boundary portion between the first top wall 76c and the first outer side wall 76b. That is, the first inner side wall 76a and the first outer side wall 76b are not shown in FIGS. 3 and 4.

The first support bead 74 includes a plurality of first protruding beads 78 and a plurality of first extending beads 80. The plurality of first protruding beads 78 protrude between the first fluid passage seals 62e to 62g (outer fluid passage seals) and the first flow field seal 64. The plurality of first extending beads 80 extend along the first fluid passage seals 62e to 62g and the first flow field seal 64.

As shown in FIG. 4, the first protruding bead 78 protrudes inward of the first separator body 52. The protruding end portion of the first protruding bead 78 is formed in a triangular shape that tapers in the protruding direction. However, the protruding end portion of the first protruding bead 78 may have a trapezoidal shape that tapers in the protruding direction.

As shown in FIG. 3, among the plurality of first protruding beads 78, the first protruding beads 78 positioned between the first fluid passage seals 62e and 62f and the first bulging portions 64a to 64f are hereinafter referred to as "first protruding beads 78a". In addition, among the plurality of first protruding beads 78, the first protruding beads 78 positioned between the first bulging portions 64c and 64f and the first fluid passage seal 62g are referred to as "first protruding beads 78b". Further, among the plurality of first protruding beads 78, the first protruding beads 78 positioned between the first fluid passage seals 62g and the portion of the first flow field seal 64 covering the oxygen-containing gas flow field 54 are referred to as "first protruding beads 78c".

Among the plurality of first extending beads 80, the first extending beads 80 facing the first bulging portions 64a to 64f in the direction of the arrow B (the longitudinal direction of the first separator member 30) are referred to as "first extending beads 80a". In addition, among the plurality of first extending beads 80, the first extending beads 80 facing the first fluid passage seals 62e and 62f (outer fluid passage seals) are referred to as "first extending beads 80b". Further, among the plurality of first extending beads 80, the first extending beads 80 facing the first bulging portions 64c and 64f in the direction of the arrow C2 are referred to as "first extending beads 80c". Among the plurality of first extending beads 80, the first extending beads 80 facing the first fluid passage seals 62g are referred to as "first extending beads 80d". Further, among the plurality of first extending beads 80, the first extending bead 80 facing the first flow field seal 64 in the direction of the arrow C2 is referred to as "first extending bead 80e".

As shown in FIG. 4, the first extending beads 80a and 80b are located on the left and right sides of the first protruding bead 78a. In other words, the first protruding bead 78a is adjacent to each of the first extending beads 80a and 80b. A width W1 of the first protruding bead 78a is larger than each of a width W2 of the first extending bead 80a and a width W3 of the first extending bead 80b (see FIGS. 7 and 8). The width W2 of the first extending bead 80a is smaller than the width W3 of the first extending bead 80b. That is, the first support bead 74 is formed such that W1>W3>W2 is established. The width W2 of the first extending bead 80$a$ may be larger than or equal to the width W3 of the first extending bead 80$b$.

The first extending beads 80$c$ and 80$d$ are positioned on the left and right sides of the first protruding bead 78$b$. In other words, the first protruding bead 78$b$ is adjacent to each of the first extending beads 80$c$ and 80$d$. A width W4 of the first protruding bead 78$b$ is larger than each of a width W5 of the first extending bead 80$c$ and a width W6 of the first extending bead 80$d$. The width W5 of the first extending bead 80$c$ is larger than the width W6 of the first extending bead 80$d$. That is, the first support bead 74 is formed such that W4>W5>W6 is established. The width W5 of the first extending bead 80$c$ may be smaller than or equal to the width W6 of the first extending bead 80$d$.

The first extending beads 80$d$ and 80$e$ are positioned on the left and right sides of the first protruding bead 78$c$. In other words, the first protruding bead 78$c$ is adjacent to each of the first extending beads 80$d$ and 80$e$. A width W7 of the first protruding bead 78$c$ is larger than each of a width W6 of the first extending bead 80$d$ and a width W8 of the first extending bead 80$e$. The width W6 of the first extending bead 80$d$ is the same as the width W8 of the first extending bead 80$e$. That is, the first support bead 74 is formed such that W7>W6 and W6=W8 are established. The width W6 of the first extending bead 80$d$ may be larger or smaller than the width W8 of the first extending bead 80$e$.

Thus, in the first support bead 74, each of the first protruding beads 78 is formed to be wider than the first extending beads 80 adjacent to the first protruding bead 78.

Figure 5:
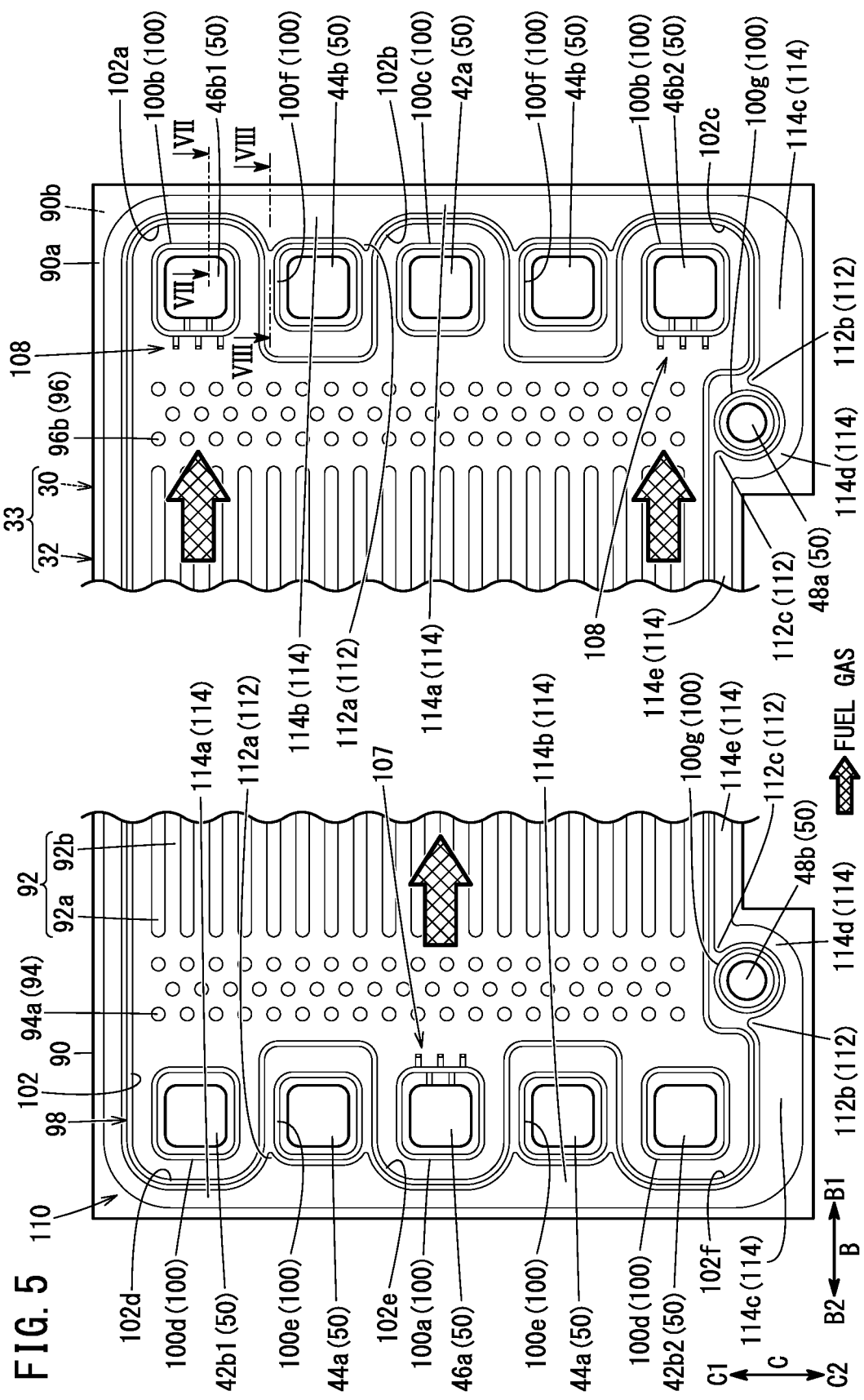
FIG. 5 is a partially omitted plan view of the joint separator of FIG. 2 as viewed from the side where a second separator member is located.

As shown in FIGS. 2 and 5, the second separator member 32 includes a second separator body 90 made of metal and having a plate shape. The second separator body 90 has, on its surface facing the resin frame equipped MEA 28 (hereinafter referred to as "surface 90$a$"), a fuel gas flow field 92 (reactant gas flow field) extending in the direction of the arrow B, for example. The fuel gas flow field 92 is connected to (in fluid communication with) the fuel gas supply passage 46$a$, the first fuel gas discharge passage 46$b$1, and the second fuel gas discharge passage 46$b$2. The fuel gas flow field 92 includes a plurality of linear flow grooves 92$b$. The plurality of linear flow grooves 92$b$ are formed between a plurality of linear protrusions 92$a$ extending in the direction of the arrow B. However, the fuel gas flow field 92 (the protrusions 92$a$ and the flow grooves 92$b$) may extend in a wavy shape in the direction of the arrow B.

A second inlet buffer 94 and a second outlet buffer 96 are provided on the surface 90$a$ of the second separator body 90. The second inlet buffer 94 is located between the fuel gas supply passage 46$a$ and the fuel gas flow field 92. The second inlet buffer 94 has a plurality of boss arrays each including a plurality of bosses 94$a$ arranged in the direction of the arrow C. The second outlet buffer 96 is located between the first fuel gas discharge passage 46$b$1 and the fuel gas flow field 92 and between the second fuel gas discharge passage 46$b$2 and the fuel gas flow field 92. The second outlet buffer 96 has a plurality of boss arrays each including a plurality of bosses 96$b$ arranged in the direction of the arrow C.

A second seal 98 for preventing leakage of fluid is provided on the surface 90$a$ of the second separator body 90. The second seal 98 extends linearly when viewed from the separator thickness direction (direction of the arrow A). However, the second seal 98 may extend in a wavy shape when viewed from the separator thickness direction.

The second seal 98 includes a plurality of second fluid passage seals 100 that surround the plurality of fluid passages 50, respectively, and the second flow field seal 102 (second outer peripheral seal) provided on the outer peripheral portion of the second separator body 90.

Hereinafter, among the plurality of second fluid passage seals 100, the second fluid passage seal 100 surrounding the fuel gas supply passage 46$a$ is referred to as "second fluid passage seal 100$a$". Among the plurality of second fluid passage seals 100, the second fluid passage seals 100 surrounding the first fuel gas discharge passage 46$b$1 and the second fuel gas discharge passage 46$b$2 are referred to as "second fluid passage seals 100$b$". Among the plurality of second fluid passage seals 100, the second fluid passage seal 100 surrounding the oxygen-containing gas supply passage 42$a$ is referred to as "second fluid passage seal 100$c$". Among the plurality of second fluid passage seals 100, the second fluid passage seals 100 surrounding the first oxygen-containing gas discharge passage 42$b$1 and the second oxygen-containing gas discharge passage 42$b$2 are referred to as "second fluid passage seals 100$d$". Among the plurality of second fluid passage seals 100, the second fluid passage seals 100 surrounding the coolant supply passages 44$a$ are referred to as "second fluid passage seals 100$e$". Among the plurality of second fluid passage seals 100, the second fluid passage seals 100 surrounding the coolant discharge passages 44$b$ are referred to as "second fluid passage seals 100$f$". Among the plurality of second fluid passage seals 100, the second fluid passage seals 100 surrounding the first drain passage 48$a$ and the second drain passage 48$b$ are referred to as "second fluid passage seals 100$g$".

The second flow field seal 102 prevents leakage of the reactant gas (fuel gas). The second flow field seal 102 surrounds the fuel gas flow field 92, the second inlet buffer 94, the second outlet buffer 96, and the plurality of second fluid passage seals 100$a$ to 100$d$. The second fluid passage seals 100$e$ to 100$g$ are outer fluid passage seals positioned outside the second flow field seal 102.

The second flow field seal 102 meanders on one end side (direction of the arrow B1) in the longitudinal direction of the second separator body 90. The second flow field seal 102 extends between the first fuel gas discharge passage 46$b$1 and the upper coolant discharge passage 44$b$. The second flow field seal 102 extends between the upper coolant discharge passage 44$b$ and the oxygen-containing gas supply passage 42$a$. The second flow field seal 102 extends between the oxygen-containing gas supply passage 42$a$ and the lower coolant discharge passage 44$b$. The second flow field seal 102 extends between the lower coolant discharge passage 44$b$ and the second fuel gas discharge passage 46$b$2. Therefore, on one end side in the longitudinal direction of the second separator body 90, the second flow field seal 102 has three second bulging portions 102$a$, 102$b$, and 102$c$ that bulge toward one of the short sides of the second separator body 90. The second bulging portion 102$a$ partially surrounds the first fuel gas discharge passage 46$b$1. The second bulging portion 102$b$ partially surrounds the oxygen-containing gas supply passage 42$a$. The second bulging portion 102$c$ partially surrounds the second fuel gas discharge passage 46$b$2.

The second flow field seal 102 meanders on the other end side (direction of the arrow B2) in the longitudinal direction of the second separator body 90. The second flow field seal 102 extends between the first oxygen-containing gas discharge passage 42$b$1 and the upper coolant supply passage 44$a$. The second flow field seal 102 extends between the upper coolant supply passage 44$a$ and the fuel gas supply passage 46a. The second flow field seal 102 extends between the fuel gas supply passage 46a and the lower coolant supply passage 44a. The second flow field seal 102 extends between the lower coolant supply passage 44a and the second oxygen-containing gas discharge passage 42b2. Therefore, on the other end side in the longitudinal direction of the second separator body 90, the second flow field seal 102 has three second bulging portions 102d, 102e, and 102f that bulge toward the other short side of the second separator body 90. The second bulging portion 102d partially surrounds the first oxygen-containing gas discharge passage 42b1. The second bulging portion 102e partially surrounds the fuel gas supply passage 46a. The second bulging portion 102f partially surrounds the second oxygen-containing gas discharge passage 42b2.

As shown in FIG. 7, the second seal 98 includes a second seal bead 104 and a second resin member 106. The second seal bead 104 is a metal-molded portion formed integrally with the second separator body 90 by press forming so as to protrude toward the resin frame equipped MEA28. The cross-sectional shape of the second seal bead 104 is a trapezoidal shape that tapers in the protruding direction of the second seal bead 104. That is, the second seal bead 104 is elastically deformed by the compression load in the stacking direction of the first separator member 30 and the second separator member 32.

The second seal bead 104 includes a pair of second bead side portions 104a disposed so as to face each other, and a second bead top portion 104b connecting protruding ends of the pair of second bead side portions 104a. An interval between the pair of second bead side portions 104a gradually decreases toward the second bead top portion 104b. The second bead side portions 104a may be parallel to the separator thickness direction (direction of the arrow A). That is, the cross-sectional shape of the second seal bead 104 may be a rectangular shape or a square shape.

The second resin member 106 is provided on the second seal bead 104. The second resin member 106 is an elastic member fixed to the protruding end surface of the second seal bead 104 (the outer surface of the second bead top portion 104b) by, for example, printing or coating. The second resin member 106 is made of, for example, polyester fiber. The second resin member 106 is not porous. The second resin member 106 may be omitted.

In FIG. 5, the second separator body 90 is provided with a bridge portion 107 that allows the inside (the fuel gas supply passage 46a) and the outside (the fuel gas flow field 92) of the second fluid passage sea 1100a to communicate with each other. The second separator body 90 is provided with a bridge portion 108 that allows the inside (the first fuel gas discharge passage 46b1 or the second fuel gas discharge passage 46b2) and the outside (the fuel gas flow field 92) of the second fluid passage seal 100b to communicate with each other.

In FIG. 7, a second support bead 110 is provided outside the second seal 98 in the second separator body 90. The second support bead 110 is formed to be lower in height than the second seal bead 104. The second support bead 110 restricts inclination of the second seal bead 104. The second support bead 110 extends along the outer periphery of the second seal 98. The second support bead 110 is a metal-molded portion formed integrally with the surface 90a of the second separator body 90 and protruding therefrom. The second support bead 110 is adjacent to the second seal bead 104. The second support bead 110 protrudes from the second separator body 90 in the same direction (direction toward the resin frame member 34) as the protruding direction of the second seal bead 104.

In FIG. 7, in a state in which the second separator member 32 is incorporated into the fuel cell stack 10, a protruding length 1b of the second support bead 110 is shorter than a protruding length Lb of the second seal 98. Therefore, the second support bead 110 is separated from the resin frame member 34. That is, there is a slight gap between the second support bead 110 and the resin frame member 34. Therefore, the second support bead 110 does not receive a compression load from the resin frame member 34. The second support bead 110 may be in contact with the resin frame member 34 so as not to receive a compression load. However, when an impact load in the direction of the arrow A acts on the fuel cell stack 10, the second support bead 110 comes into contact with the resin frame member 34 and receives the impact load. The protruding length 1b of the second support bead 110 is preferably equal to the protruding length 1a of the first support bead 74. Further, the protruding length Lb of the second seal 98 is preferably equal to the protruding length La of the first seal 60.

Specifically, in a state in which the second separator member 32 is incorporated into the fuel cell stack 10, the protruding length 1b of the second support bead 110 is shorter than the protruding length of the second seal bead 104. In a state in which the second separator member 32 is incorporated into the fuel cell stack 10, the protruding length 1b of the second support bead 110 is preferably 50% or more and less than 100% of the protruding length of the second seal bead 104, more preferably 60% or more and 90% or less of the protruding length of the second seal bead 104, and even more preferably 70% or more and 90% or less of the protruding length of the second seal bead 104. In this case, when the second separator member 32 is incorporated into the fuel cell stack 10, the second support bead 110 can effectively prevent the second seal bead 104 from being inclined in the planar direction. Further, the impact load in the direction of the arrow A can be effectively received by the second support bead 110. The protruding length of the second support bead 110 can be appropriately set.

The second support bead 110 extends along and around the outer periphery of the second separator body 90 (see FIG. 2). In other words, the second support bead 110 is positioned outside the plurality of second fluid passage seals 100 and outside the second flow field seal 102. The outer periphery of the second support bead 110 extends along the outer periphery of the second separator body 90.

The cross-sectional shape of the second support bead 110 is a trapezoidal shape that tapers in the protruding direction of the second support bead 110. The second support bead 110 includes a second inner side wall 110a, a second outer side wall 110b, and a second top wall 110c. The second inner side wall 110a is located inward of the second separator body 90. The second outer side wall 110b is located outward of the second separator body 90. The second top wall 110c connects the protruding end of the second inner side wall 110a and the protruding end of the second outer side wall 110b to each other. An interval between the second inner side wall 110a and the second outer side wall 110b gradually decreases toward the second top wall 110c. The root of the second inner side wall 110a is close to the root of the second bead side portion 104a.

The root of the second inner side wall 110a may be connected to the root of the second bead side portion 104a. The root of the second inner side wall 110a may be connected to an intermediate portion of the second bead side portion 104a. In addition, the second inner side wall 110a and the second outer side wall 110b may extend parallel to the separator thickness direction (direction of the arrow A). That is, the cross-sectional shape of the second support bead 110 may be a rectangular shape or a square shape.

Figure 6:
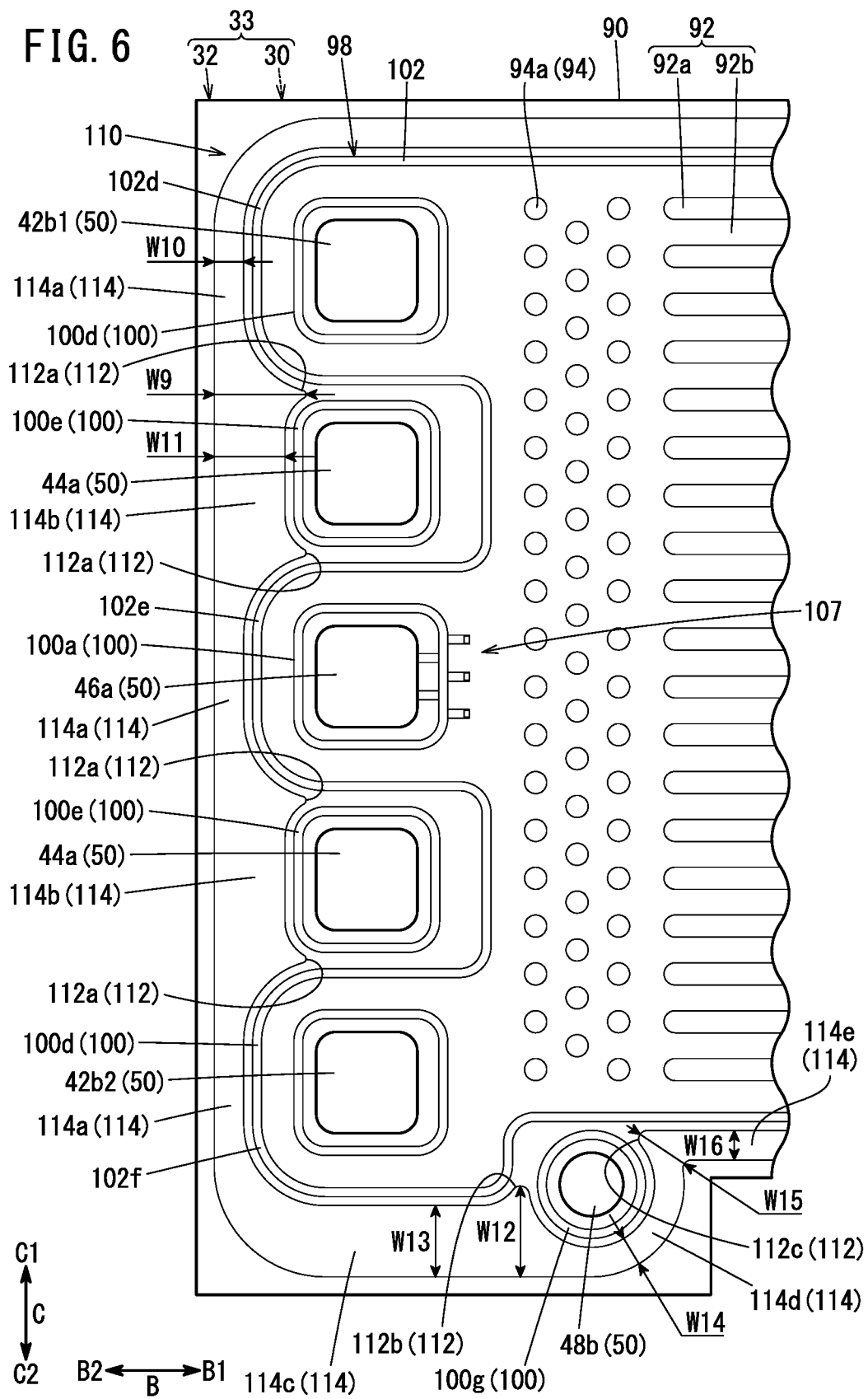
FIG. 6 is a partially enlarged plan view of the joint separator of FIG. 5.

In FIGS. 5, 7 and 8, the outer peripheral edge portion (second outer side wall 110b) of the second support bead 110 has a portion extending linearly along the outer edge of the second separator body 90. A width $W_B$ of the second support bead 110 (the width of the second top wall 110c shown in FIG. 7) varies depending on the position of the second support bead 110 in the extending direction thereof. The width $W_B$ of the second support bead 110 is preferably set to be the same as the width $W_A$ of the first support bead 74 (WA=WB) in a portion where the first separator member 30 and the second separator member 32 overlap each other in the stacking direction (direction of the arrow A). Here, the width $W_B$ of the second support bead 110 refers to a length in a direction orthogonal to the extending direction of the second support bead 110 and to the separator thickness direction. In FIGS. 5 and 6, for the sake of convenience, an inner boundary portion of the second top wall 110c and an outer boundary portion of the second top wall 110c are shown (see FIGS. 7 and 8). The inner boundary portion of the second top wall 110c is a boundary portion between the second top wall 110c and the second inner side wall 110a. The outer boundary portion of the second top wall 110c is a boundary portion between the second top wall 110c and the second outer side wall 110b. That is, the second inner side wall 110a and the second outer side wall 110b are not shown in FIGS. 5 and 6.

The second support bead 110 includes a plurality of second protruding beads 112 and a plurality of second extending beads 114. The plurality of second protruding beads 112 are provided so as to protrude between the second fluid passage seals 100e to 100g (outer fluid passage seals) and the second flow field seal 102. The plurality of second extending beads 114 extend along the second fluid passage seals 100e to 100g and the second flow field seal 102.

As shown in FIG. 6, the second protruding bead 112 protrudes inward of the second separator body 90. The protruding end portion of the second protruding bead 112 is formed in a triangular shape that tapers in the protruding direction. However, the protruding end portion of the second protruding bead 112 may have a trapezoidal shape that tapers in the protruding direction.

As shown in FIG. 5, among the plurality of second protruding beads 112, the second protruding beads 112 positioned between the second fluid passage seals 100e and 100f and the second bulging portions 102a to 102f are hereinafter referred to as "second protruding beads 112a". Among the plurality of second protruding beads 112, the second protruding beads 112 positioned between the second bulging portions 102c and 102f and the second fluid passage seal 100g are referred to as "second protruding beads 112b". Further, among the plurality of second protruding beads 112, the second protruding beads 112 positioned between the second fluid passage seals 100g and the portion of the second flow field seal 102 covering the fuel gas flow field 92 are referred to as "second protruding beads 112c".

Among the plurality of second extending beads 114, the second extending beads 114 facing the second bulging portions 102a to 102f in the direction of the arrow B (the longitudinal direction of the second separator member 32) are referred to as "second extending beads 114a". In addition, among the plurality of second extending beads 114, the second extending beads 114 facing the second fluid passage seals 100e and 100f (outer fluid passage seals) are referred to as "second extending beads 114b". Further, among the plurality of second extending beads 114, the second extending beads 114 facing the second bulging portions 102c and 102f in the direction of the arrow C2 are referred to as "second extending beads 114c". Among the plurality of second extending beads 114, the second extending beads 114 facing the second fluid passage seals 100g are referred to as "second extending beads 114d". Further, among the plurality of second extending beads 114, the second extending bead 114 facing the second flow field seal 102 in the direction of the arrow C2 is referred to as "second extending bead 114e".

As shown in FIG. 6, the second extending beads 114a and 114b are located on the left and right sides of the second protruding bead 112a. In other words, the second protruding bead 112a is adjacent to each of the second extending beads 114a and 114b. A width W9 of the second protruding bead 112a is larger than each of a width W10 of the second extending bead 114a and a width W11 of the second extending bead 114b (see FIG. 8). The width W10 of the second extending bead 114a is smaller than the width W11 of the second extending bead 114b. That is, the second support bead 110 is formed such that W9>W11>W10 is established. The width W10 of the second extending bead 114a may be larger than or equal to the width W11 of the second extending bead 114b.

The second extending beads 114c and 114d are located on the left and right sides of the second protruding bead 112b. In other words, the second protruding bead 112b is adjacent to each of the second extending beads 114c and 114d. A width W12 of the second protruding bead 112b is larger than each of a width W13 of the second extending bead 114c and a width W14 of the second extending bead 114d. That is, the second support bead 110 is formed such that W12>W13>W14 is established. The width W13 of the second extending bead 114c may be smaller than or equal to the width W14 of the second extending bead 114d.

The second extending beads 114d and 114e are located on the left and right sides of the second protruding bead 112c. In other words, the second protruding bead 112c is adjacent to each of the second extending beads 114d and 114e. A width W15 of the second protruding bead 112c is larger than each of a width W14 of the second extending bead 114d and a width W16 of the second extending bead 114e. The width W14 of the second extending bead 114d is the same as the width W16 of the second extending bead 114e. That is, the second support bead 110 is formed such that W15>W14 and W14=W16 are established. The width W14 of the second extending bead 114d may be larger or smaller than the width W16 of the second extending bead 114e.

As described above, in the second support bead 110, each of the second protruding beads 112 is formed to be wider than the second extending beads 114 adjacent to the second protruding bead 112.

In FIG. 2, a coolant flow field 116 is formed between a back surface 52b of the first separator body 52 and a back surface 90b of the second separator body 90 which are joined to each other. The coolant flow field 116 is connected to (in fluid communication with) the coolant supply passage 44a and the coolant discharge passage 44b. When the first separator member 30 and the second separator member 32 are stacked together, the coolant flow field 116 is formed on the back surface of the oxygen-containing gas flow field 54 formed on the first separator body 52 and the back surface of the fuel gas flow field 92 formed on the second separator body 90.

The operation of the fuel cell stack 10 configured as described above will be described below.

First, as shown in FIG. 1, the oxygen-containing gas is supplied to the oxygen-containing gas supply passage 42a of the end plate 20a. The fuel gas is supplied to the fuel gas supply passage 46a of the end plate 20a. The coolant is supplied to the coolant supply passage 44a of the end plate 20a.

As shown in FIG. 3, the oxygen-containing gas is introduced into the oxygen-containing gas flow field 54 of the first separator member 30 through the oxygen-containing gas supply passage 42a. The oxygen-containing gas flows along the oxygen-containing gas flow field 54 in the direction of the arrow B, and is supplied to the cathode 38 on the MEA28a shown in FIG. 2.

On the other hand, as shown in FIG. 5, the fuel gas is introduced from the fuel gas supply passage 46a to the fuel gas flow field 92 of the second separator member 32. The fuel gas flows along the fuel gas flow field 92 in the direction of the arrow B, and is supplied to the anode 40 on the MEA28a shown in FIG. 2.

Therefore, in each MEA28a, the oxygen-containing gas supplied to the cathode 38 and the fuel gas supplied to the anode 40 are partially consumed in the electrochemical reaction in the first electrode catalyst layer and the second electrode catalyst layer to perform power generation.

Subsequently, the oxygen-containing gas supplied to and partially consumed by the cathode 38 is discharged in the direction of the arrow A along the first oxygen-containing gas discharge passage 42b1 and the second oxygen-containing gas discharge passage 42b2. Similarly, the fuel gas supplied to and partially consumed by the anode 40 is discharged in the direction of the arrow A along the first fuel gas discharge passage 46b1 and the second fuel gas discharge passage 46b2.

The coolant supplied to the coolant supply passage 44a is introduced into the coolant flow field 116 formed between the first separator member 30 and the second separator member 32, and then flows in the direction of the arrow B. After cooling the MEA28a, the coolant is discharged from the coolant discharge passage 44b.

The present embodiment has the following effects.

The first support bead 74 is provided outside the first seal 60 in the first separator body 52. The first support bead 74 is formed to be lower in height than the first seal bead 66. The first support bead 74 restricts inclination of the first seal bead 66. The first support bead 74 extends along the first seal 60. The first support bead 74 is formed integrally with the first separator body 52 and protrudes from the first separator body 52. The width of the first support bead 74 varies depending on the position of the first support bead 74 in the extending direction thereof.

The second support bead 110 is provided outside the second seal 98 in the second separator body 90. The second support bead 110 is formed to be lower in height than the second seal bead 104. The second support bead 110 restricts inclination of the second seal bead 104. The second support bead 110 extends along the second seal 98. The second support bead 110 is formed integrally with the second separator body 90 and protrudes from the second separator body 90. The width of the second support bead 110 varies depending on the position of the second support bead 110 in the extending direction thereof.

According to such a configuration, the width of the first support bead 74 (the second support bead 110) varies depending on the position of the first support bead 74 (the second support bead 110) in the extending direction thereof. Therefore, the rigidity of the first support bead 74 (second support bead 110) in the width direction can be improved. Furthermore, when the first separator member 30 and the second separator member 32 are stacked on the MEA28a and a compression load is applied thereto, the first support bead 74 (the second support bead 110) can effectively prevent the first seal bead 66 (the second seal bead 104) from being inclined. In other words, the movement of the root of the first seal bead 66 (the second seal bead 104) toward the outer side can be suppressed by the first support bead 74 (the second support bead 110). Accordingly, it is possible to effectively suppress the inclination of the first support bead 74 (the second support bead 110). Therefore, it is possible to ensure a desired sealing property by the first seal 60 (the second seal 98).

The first seal 60 includes the first flow field seal 64 and the plurality of first fluid passage seals 62. The first flow field seal 64 surrounds the oxygen-containing gas flow field 54. The plurality of first fluid passage seals 62 surround the plurality of fluid passages 50, respectively. The first support bead 74 is positioned outside the plurality of first fluid passage seals 62 and the first flow field seal 64.

The second seal 98 includes the second flow field seal 102 and the plurality of second fluid passage seals 100. The second flow field seal 102 surrounds the fuel gas flow field 92. The plurality of second fluid passage seals 100 surround the plurality of fluid passages 50, respectively. The second support bead 110 is positioned outside the plurality of second fluid passage seals 100 and the second flow field seal 102.

According to such a configuration, it is possible to ensure a desired sealing property by the plurality of first fluid passage seals 62 (second fluid passage seals 100). In addition, it is possible to ensure a desired sealing property by the first flow field seal 64 (the second flow field seal 102).

The first support bead 74 includes the plurality of first protruding beads 78 and the first extending bead 80. The plurality of first protruding beads 78 are provided so as to protrude between the plurality of first fluid passage seals 62e to 62g and the first flow field seal 64. The first extending bead 80 extends along the first flow field seal 64 and the plurality of first fluid passage seals 62e to 62g. The first protruding bead 78 is formed to be wider than the first extending bead 80 adjacent to the first protruding bead 78.

The second support bead 110 includes the plurality of second protruding beads 112 and the second extending bead 114. The plurality of second protruding beads 112 are provided so as to protrude between the plurality of second fluid passage seals 100e to 100g and the second flow field seal 102. The second extending bead 114 extends along the second flow field seal 102 and the plurality of second fluid passage seals 100e to 100g. The second protruding bead 112 is formed to be wider than the second extending bead 114 adjacent to the second protruding bead 112.

According to such a configuration, with a simple configuration, the width of the first support bead 74 (the second support bead 110) can be varied depending on the position of the first support bead 74 (the second support bead 110) in the extending direction thereof.

The first support bead 74 extends along and around the outer edge of the first separator body 52. Further, the second support bead 110 extends along and around the outer edge of the second separator body 90.

According to such a configuration, it is possible to effectively improve the rigidity of the first support bead 74 (the second support bead 110) in the width direction.

The present invention is not limited to the above-described embodiment, and various modifications can be made thereto without departing from the scope of the present invention.

The above embodiment is summarized as follows.

The above embodiment discloses a separator member (30, 32) configured to be incorporated into a fuel cell stack (10) in a manner that the separator member is stacked on a membrane electrode assembly (28a) including an electrolyte membrane (36) and an electrode (38, 40) disposed on each of both sides of the electrolyte membrane, wherein a compression load in a separator thickness direction is applied to the separator member, the separator member includes a separator body (52, 90) made of metal and having a plate shape, the separator body is provided with a reactant gas flow field (54, 92) configured to allow a reactant gas to flow along the electrode, a plurality of fluid passages (50) penetrating the separator body in the separator thickness direction and connected to the reactant gas flow field or a coolant flow field (116), and a seal (60, 98) positioned around the reactant gas flow field and the plurality of fluid passages and configured to prevent leakage of a fluid formed of the reactant gas or a coolant, the seal includes a seal bead (66, 104) formed integrally with the separator body and protruding from the separator body so as to be elastically deformable by the compression load, a support bead (74, 110) formed to be lower in height than the seal bead and configured to restrict inclination of the seal bead is provided outside the seal in the separator body, the support bead extends along the seal, and is formed integrally with the separator body and protrudes from the separator body, and a width of the support bead varies depending on a position of the support bead in a direction in which the support bead extends.

In the separator member described above, the seal may include a flow field seal (64, 102) surrounding the reactant gas flow field, and a plurality of fluid passage seals (62, 100) surrounding the plurality of fluid passages, respectively, and the support bead may be positioned outside the plurality of fluid passage seals and the flow field seal.

In the separator member described above, the plurality of fluid passage seals may include a plurality of outer fluid passage seals (62e to 62g, 100e to 100g) positioned outside the flow field seal, the support bead may include a plurality of protruding beads (78a to 78c, 112a to 112c) provided so as to protrude between the plurality of outer fluid passage seals and the flow field seal, and an extending bead (80, 114) extending along the flow field seal and the plurality of outer fluid passage seals, and each of the protruding beads may be formed to be wider than the extending bead adjacent to the protruding bead.

In the separator member described above, an outer peripheral end of the support bead may include a linearly extending portion.

In the separator member described above, the support bead may extend along and around an outer edge of the separator body.

In the separator member described above, the support bead may extend so as to surround the flow field seal.

In the separator member described above, the plurality of fluid passage seals may include a plurality of inner fluid passage seals (62a to 62d, 100a to 100d) positioned inside the flow field seal, the flow field seal may include a bulging portion (64a to 64f, 102a to 102f) that partially surrounds each of the plurality of inner fluid passage seals, and at least one of the plurality of protruding beads may protrude between the bulging portion and one of the outer fluid passage seals.

The above-described embodiment discloses a fuel cell (12) comprising: a membrane electrode assembly including an electrolyte membrane and an electrode disposed on each of both sides of the electrolyte membrane; and a pair of separator members disposed on both sides of the membrane electrode assembly, wherein a compression load in a separator thickness direction is applied to the fuel cell, and at least one of the pair of separator members is the above-described separator member.

In the above fuel cell, a resin frame member (34) may be provided on an outer peripheral portion of the membrane electrode assembly, each of the pair of separator members may include the seal bead, and the resin frame member may be sandwiched by the seal beads of the pair of separator members.

What is claimed is:

1. Separator member configured to be incorporated into a fuel cell stack in a manner that the separator member is stacked on a membrane electrode assembly including an electrolyte membrane and an electrode disposed on each of both sides of the electrolyte membrane, wherein
   a compression load in a separator thickness direction is applied to the separator member,
   the separator member includes a separator body made of metal and having a plate shape,
   the separator body is provided with:
   a reactant gas flow field configured to allow a reactant gas to flow along the electrode;
      a plurality of fluid passages penetrating the separator body in the separator thickness direction and connected to the reactant gas flow field or a coolant flow field; and
      a seal positioned around the reactant gas flow field and the plurality of fluid passages and configured to prevent leakage of a fluid formed of the reactant gas or a coolant,
   the seal includes a seal bead formed integrally with the separator body and protruding from the separator body so as to be elastically deformable by the compression load,
   a support bead formed to be lower in height than the seal bead and configured to restrict inclination of the seal bead is provided outside the seal in the separator body,
   the support bead extends along the seal, and is formed integrally with the separator body and protrudes from the separator body, and
   a width of the support bead varies depending on a position of the support bead in a direction in which the support bead extends, wherein
   the seal includes:
      a flow field seal surrounding the reactant gas flow field; and
      a plurality of fluid passage seals surrounding the plurality of fluid passages, respectively, and
   the support bead is positioned outside the plurality of fluid passage seals and the flow field seal,
   the plurality of fluid passage seals include:
      a plurality of inner fluid passage seals positioned inside the flow field seal; and
      a plurality of outer fluid passage seals positioned outside the flow field seal,
   the flow field seal includes bulging portions that partially surround the plurality of inner fluid passage seals respectively to separate the plurality of outer fluid passage seals and the plurality of inner fluid passage seals that are adjacent to each other, gaps are formed between the bulging portions and the plurality of outer fluid passage seals that are adjacent to each other, the support bead includes:
a plurality of protruding beads provided so as to protrude toward the gaps; and
an extending bead extending along the flow field seal and the plurality of outer fluid passage seals, and each of the protruding beads is formed to be wider than the extending bead adjacent to the protruding bead.

2. The separator member according to claim 1, wherein an outer peripheral end of the support bead includes a linearly extending portion.

3. The separator member according to claim 1, wherein the support bead extends along and around an outer edge of the separator body.

4. The separator member according to claim 1, wherein the support bead extends so as to surround the flow field seal.

5. The separator member according to claim 1 wherein the support bead that extends along the flow field seal and the plurality of outer fluid passage seals further goes around continuously without interruption.

6. A fuel cell comprising:
a membrane electrode assembly including an electrolyte membrane and an electrode disposed on each of both sides of the electrolyte membrane; and
a pair of separator members disposed on both sides of the membrane electrode assembly, wherein
a compression load in a separator thickness direction is applied to the fuel cell,
at least one of the pair of separator members includes a separator body made of metal and having a plate shape,
the separator body is provided with:
a reactant gas flow field configured to allow a reactant gas to flow along the electrode;
a plurality of fluid passages penetrating the separator body in the separator thickness direction and connected to the reactant gas flow field or a coolant flow field; and
a seal positioned around the reactant gas flow field and the plurality of fluid passages and configured to prevent leakage of a fluid formed of the reactant gas or a coolant,
the seal includes a seal bead formed integrally with the separator body and protruding from the separator body so as to be elastically deformable by the compression load,
a support bead formed to be lower in height than the seal bead and configured to restrict inclination of the seal bead is provided outside the seal in the separator body, the support bead extends along the seal, and is formed integrally with the separator body and protrudes from the separator body, and
a width of the support bead varies depending on a position of the support bead in a direction in which the support bead extends, wherein
the seal includes:
a flow field seal surrounding the reactant gas flow field; and
a plurality of fluid passage seals surrounding the plurality of fluid passages, respectively, and
the support bead is positioned outside the plurality of fluid passage seals and the flow field seal,
the plurality of fluid passage seals include:
a plurality of inner fluid passage seals positioned inside the flow field seal; and
a plurality of outer fluid passage seals positioned outside the flow field seal,
the flow field seal includes bulging portions that partially surround the plurality of inner fluid passage seals respectively to separate the plurality of outer fluid passage seals and the plurality of inner fluid passage seals that are adjacent to each other,
gaps are formed between the bulging portions and the plurality of outer fluid passage seals that are adjacent to each other,
the support bead includes:
a plurality of protruding beads provided so as to protrude toward the gaps; and
an extending bead extending along the flow field seal and the plurality of outer fluid passage seals, and
each of the protruding beads is formed to be wider than the extending bead adjacent to the protruding bead.

7. The fuel cell according to claim 6, wherein an outer peripheral end of the support bead includes a linearly extending portion.

8. The fuel cell according to claim 6, wherein the support bead extends along and around an outer edge of the separator body.

9. The fuel cell according to claim 6, wherein the support bead extends so as to surround the flow field seal.

10. The fuel cell according to claim 6, wherein a resin frame member is provided on an outer peripheral portion of the membrane electrode assembly,
each of the pair of separator members includes the seal bead, and
the resin frame member is sandwiched by the seal beads of the pair of separator members.

11. The fuel cell according to claim 6, wherein the support bead that extends along the flow field seal and the plurality of outer fluid passage seals further goes around continuously without interruption.

* * * * *